3,178,343
PHARMACEUTICAL COMPOSITIONS AND
METHOD OF USING SAME
Friedrich Kradolfer, Basel, and Werner Sackmann, Riehen, Switzerland, assignors to Ciba Corporation, New York, N.Y., a corporation of Delaware
No Drawing. Filed Nov. 27, 1962, Ser. No. 240,422
18 Claims. (Cl. 167—55)

This is a continuation-in-part of our application Serial No. 85,977, filed January 31, 1961, now abandoned.

This invention relates to and has for its object the provision of novel compositions (and methods for their preparation), useful for the treatment and/or prevention of intestinal, e.g. diarrhoeal affections, whether acute or chronic. Its indications include:

Acute diarrhoea, chronic, relapsing diarrhoea, summer diarrhoea, gastro-enteritis, enteritis, enterocolitis, colitis, bacterial dysentery, mixed bacterial and parasitic infections, amoebiasis, especially chronic forms, giardiasis, trichomoniasis, antibiotic enteritis, e.g. intestinal moniliasis, caused by species of Blastomycetes. Most surprisingly, the new compositions are in addition also useful for the treatment of obstipation, meteorism and flatulence and other conditions of a similar nature.

These compositions contain (1) 4:7-phenanthroline-5:6-quinone and (2) 5-chloro-8-hydroxy-7-iodoquinoline together with a pharmaceutical carrier. A spasmolytic agent (3), such as diethyl-(2-hydroxyethyl)-methyl-ammoniumbromide - α - phenyl-cyclohexaneglycolate or an equivalent compound may optionally be incorporated in the composition except in those cases where obstipation or similar conditions with diminished intestinal motility are involved. The proportions of the active ingredients in the new compositions may vary. Advantageously they may contain the above ingredients (1) and (2) in a weight ratio from about 1:3 to about 1:30 and optionally the ingredient (3) in an amount from about $\frac{1}{30}$ to about $\frac{1}{3}$ of that of (1). More specifically they may contain per 10-30 mg. 4:7-phenanthroline-5:6-quinone 100-300 mg. 5-chloro-8-hydroxy-7-iodo-quinoline and, if desired, 1-3 mg. diethyl-(2-hydroxyethyl)-methyl-ammonium-bromide-α-phenyl-cyclohexaneglycolate. Especially valuable compositions contain—preferably in a single dosage unit—per 20 mg. 4:7-phenanthroline-5:6-quinone, 200 mg. 5-chloro-8-hydroxy-7-iodoquinoline and, if desired, 2 mg. diethyl - (2-hydroxyethyl)-methyl-ammonium-bromide-α-phenyl-cyclohexaneglycolate. The daily dosage may vary according to the individual needs of each patient and may be easily determined by the practicing physician. Preferably it is equivalent to an amount of about 60 mg. 4:7-phenanthroline-5:6-quinone, 600 mg. 5-chloro-8-hydroxy-7-iodo-quinoline and, if desired, 6 mg. diethyl-(2-hydroxyethyl) - methyl-ammoniumbromide-α-phenyl-cyclohexaneglycolate. This dose may be divided into 2 to 3 single dosages. In aggravated cases the dosage may be doubled. Children of course, are given smaller dosages, e.g. $\frac{1}{3}$ or $\frac{2}{3}$ of the normal dose.

The new compositions possess a spectrum of action ranging from pure parasitoses to specific bacterial diseases of the gut, including also mixed bacterial and parasitic infections as well as conditions caused by a disturbed balance in the bacterial eubiosis of the intestine. It is precisely in affections of unspecified or unspecifiable origin—in which the condition is as a rule partly due to alterations in the physiological flora—that they elicit brilliant responses. Particularly they show antiparasitic and antibacterial activity against cocci, coliform bacilli, dysentery and typhoid bacilli, protozoa, e.g. amoebae, *Giardia lamblia*, trichomonads, Chilomastix and are useful for the treatment of the above cited intestinal disturbances. Due to a synergistic effect of the various components in the combination, e.g. with respect to the bactericidal activity against *S. typhi*, *Sh. sonnei*, *S. aureus*, *Sc. pyogenes* and *C. albicans*, and a different spectrum of activity against intestinal bacteria and protozoa, e.g. *S. typhi*, *C. albicans*, *Sh. sonnei*, *S. aureus*, *E. coli*, *Entamoeba histolytica* and *Trich. foetus*, the new compositions have an improved chemotherapeutic action.

The new compositions are made according to the conventional methods for formulating pharmaceutical compositions. Thus there can be employed substances which do not react with the new compounds, such as gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations are advantageously in the solid form, for example, as capsules, tablets or dragees. If desired, they may contain auxiliary substances, such as preserving agents. They may also contain, in combination, other therapeutically useful substances.

The new compositions are not only useful in human medicine, but they may also be used in veterinary medicine for the treatment of analogous conditions, e.g. in dogs, horses or cats.

The following are specific working examples for the formulation of compositions according to the invention. It is to be understood that this is merely illustrative and is in no way intended to limit the invention.

EXAMPLE 1

The following dragees can be prepared:

| 1 dragee core contains: | Mg. |
|---|---|
| 4:7-phenanthroline-5,6-quinone | 20.0 |
| 5-chloro-8-hydroxy-7-iodoquinoline | 200.0 |
| Diethyl-(2-hydroxyethyl) - methyl-ammonium-bromide-α-phenyl-cyclohexaneglycolate | 2.0 |
| Sodium dodecyl sulfate | 2.5 |
| Citric acid | 1.0 |
| Wheat starch | 27.0 |
| Gelatine | 6.0 |
| Colloidal silicic acid with hydrolyzed starch | 10.0 |
| Arrow root | 14.0 |
| Stearic acid | 9.0 |
| Talcum | 8.5 |
| | 300.0 |

| Dragee coating: | |
|---|---|
| Cellulose acetate-phthalate | 12.0 |
| Diethyl phthalate | 3.0 |
| Talcum | 55.5 |
| Non-swelling starch | 2.55 |
| Titanium dioxide | 0.89 |
| Gum arabic | 1.70 |
| Gelatine | 0.17 |
| Sugar | 164.19 |
| Orange Yellow S | Trace |
| Indigotin | Trace |
| | 240.0 |

*Preparation of dragee cores*

A moist mixture is made from a fine distribution of the active substances and an aqueous solution of sodium dodecyl sulfate and citric acid. The mixture is kneaded with a gelatine starch paste to form a plastic, granulatable mass, with the addition of colloidal silicic acid. This mass is granulated, dried completely, admixed with arrow root, colloidal silicic acid, talcum, and stearic acid, and compressed in the usual manner in a tableting machine into dragee cores which decay easily.

Stomach resistant coating

In a coating pan the dragee cores are coated in layers with a suspension consisting of cellulose acetate-phthalate, diethyl-phthalate, talcum, and organic solvents until they prove stomach-resistant for at least two hours in a test with artificial gastric juice, but decay completely within about 20 minutes in artificial intestinal juice.

Outer coating

The stomach-resistant coated cores are then coated in layers with an aqueous suspension containing sugar, non-swelling starch, gum arabic, gelatine and titanium dioxide until the lacquer layers are covered completely. There follows coating with a colored sugar solution up to a final weight of 540 mg. The crude dragees are briskly dried and then polished in polishing drums.

The compositions of the invention may also be incorporated in feeds or administered in any other standard way for animal use. When incorporated in feeds, the feed compositions may contain the usual feed components, such as grains, protein supplements, mineral supplements, green feed vitamin supplements, and other supplements in ratios and proportions known to be best adaptable to the particular bird or animal being fed. Examples of suitable feed constituents include barley, barley meal, buckwheat, corn, cornmeal, kafir, oats, oat groats, ground oats, rolled oats, rye, wheat, wheat bran, wheat shorts, wheat middlings, milk, bone meal, meat scrap, corn gluten meal, oil cake meal, soybean meal, fish meal, alfalfa, dehydrated alfalfa meal, clover, lawn clippings, cabbage, kale, cod liver oil, and similar nutrients, as well as mineral supplements, such as di-calcium phosphate, calcium carbonate, iodized salt, manganese sulfate and the like, vitamins, e.g. vitamin A, niacin, calcium pantothenate, thiamine, riboflavin, vitamin $B_{12}$, ascorbic acid, vitamin D and the like, other essential supplements, e.g. butylated hydroxy-toluene, methionine and the like, as well as other growth stimulants, such as reserpine or derivatives thereof, e.g. esters or ethers of compounds having the basic reserpine structure.

For veterinary use, it may be preferable to prepare a composition of the invention, together with a suitable blender, e.g. wheat middlings or any other suitable blender. The medicated feed is prepared according to standard procedures by adding the premix in amounts to make up the desired concentration of the active compound in the final medicated feed. A premix contains from about 0.1 to about 20 percent, more especially from 0.5 to about 10 percent of the inventive composition, together with a suitable blender. The content of the pharmacologically active ingredients may depend on the type of treatment intended, e.g. short term or prolonged medication. With respect to the therapeutic composition, the feed materials obviously represent an inert pharmaceutical carrier.

An animal feed, containing the composition of the active ingredients as shown in the example may be prepared as follows:

Premix:                                                          Grams
Composition of the active ingredients as
  shown in Example 1 _____ 800.000
Wheat standard middlings, 30–80
  mesh _____ 10,200.000
                                                                 ─────────
Total weight _____ 11,000.000

Feed formula:
                                                                 G.
Corn meal _____ 1,062.875
Fat _____ 80.000
Fish meal, 60% protein _____ 100.000
Soybean meal, 50% protein _____ 500.000
Corn gluten meal _____ 100.000
Dehydrated alfalfa meal _____ 50.000
Corn distiller solubles _____ 40.000
Di-calcium phosphate _____ 28.000
Calcium carbonate _____ 20.000
Iodized salt _____ 10.000
Vitamins A and D (1,000,000 A and
  250,000 D/pound) _____ 4.000
Calcium pantothenate _____ 0.250
Butylated hydroxy toluene _____ 0.250
Choline chloride, 25% _____ 2.500
Riboflavin conc. (24 g. per pound) _____ 0.125
Vitamin $B_{12}$ (0.02 g. per pound) _____ 1.000
Methionine _____ 0.500
Manganese sulfate _____ 0.500
                                                                 ─────────
Total weight _____ 2,000.000

The premix is made by adding the active composition to the wheat and then mixing until uniformity is obtained.

The feed formula is prepared as follows: A portion of the corn meal is introduced into the blending machine (about half of the amount to be added). The remaining corn meal, previously blended with the pre-heated, liquified fat, is added thereto and mixing is continued until uniformity is obtained. The manganese sulfate, di-calcium phosphate, calcium carbonate and iodized salt are then added with mixing, followed by the addition of the fish meal, soy bean meal, corn gluten meal and corn distiller solubles. After a uniform mixture has been obtained, vitamins A and D, calcium pantothenate, choline chloride, riboflavin, Vitamin $B_{12}$ and methionine are added in that order. Mixing is continued after the addition of butylated hydroxy toluene, and maintained until a uniform product is obtained.

The premix is added to the feed formula prepared as prepared as described above.

EXAMPLE 2

Mg.
4:7-phenanthroline-5:6-quinone _____ 20.0
5-chloro-8-hydroxy-7-iodoquinoline _____ 200.0
Sodium lauryl sulfate _____ 2.5
Wheat starch _____ 20.0
Gelatine _____ 6.0
Colloidal silicic acid with hydrolyzed starch _ 10.0
Arrow root _____ 20.0
Stearic acid _____ 12.0
Talcum _____ 9.5
                                                                 ─────────
                                                                 300.0

What is claimed is:

1. A pharmaceutical composition comprising (1) 4:7-phenanthroline-5:6-quinone and (2) 5-chloro-8-hydroxy-7-iodo-quinoline and an inert pharmaceutical carrier.

2. A pharmaceutical composition as claimed in claim 1, wherein the active ingredients (1) 4:7-phenanthroline-5:6-quinone and (2) 5-chloro-7-iodo-8-hydroxy-quinoline are present in a weight ratio from about 1:3 to about 1:30.

3. A pharmaceutical composition as claimed in claim 1, comprising about 10–30 mg. 4:7-phenanthroline-5:6-quinone about 100–300 mg. 5-chloro-7-iodo-8-hydroxy-quinoline and an inert pharmaceutical carrier.

4. A pharmaceutical composition as claimed in claim 1, comprising about 20 mg. 4:7-phenanthroline-5:6-quinone about 200 mg. 5-chloro-7-iodo-8-hydroxy-quinoline, and an inert pharmaceutical carrier.

5. A pharmaceutical composition comprising per dosage unit about 10–30 mg. 4:7-phenanthroline-5:6-quinone about 100–300 mg. 5-chloro-7-iodo-8-hydroxy-quinoline, and an inert pharmaceutical carrier.

6. A pharmaceutical composition comprising per dosage unit about 20 mg. 4:7-phenanthroline-5:6-quinone about 200 mg. 5-chloro-7-iodo-8-hydroxy-quinoline, and an inert pharmaceutical carrier.

7. A pharmaceutical composition comprising (1) 4:7-phenanthroline-5:6-quinone, (2) 5-chloro-7-iodo-8-hydroxy-quinoline and (3) diethyl-(2-hydroxyethyl)-methylammonium-bromide-α-phenyl-cyclohexaneglycolate and an inert pharmaceutical carrier.

8. A pharmaceutical composition as claimed in claim 7, wherein the active ingredients (1) 4:7-phenanthroline-5:6-quinone and (2) 5-chloro-7-iodo-8-hydroxy-quinoline are present in a weight ratio from about 1:3 to about 1:30 and wherein the (3) diethyl-(2-hydroxy-ethyl)-methyl-ammonium-bromide-α-phenyl - cyclohexaneglycolate is present in an amount from about 1/30 to 1/3 of that of (1) 4:7-phenanthroline-5:6-quinone.

9. A pharmaceutical composition as claimed in claim 7, comprising about 10–30 mg. 4:7-phenanthroline-5:6-quinone about 100–300 mg. 5-chloro-7-iodo-8-hydroxy-quinoline and about 1–3 mg. diethyl-(2-hydroxyethyl)-methylammonium-bromide - α - phenyl-cyclo - hexaneglycolate, and an inert pharmaceutical carrier.

10. A pharmaceutical composition as claimed in claim 7, comprising about 20 mg. 4:7-phenanthroline-5:6-quinone about 200 mg. 5-chloro-7-iodo-8-hydroxy-quinoline and about 2 mg. diethyl-(2-hydroxyethyl)-methyl-ammonium-bromide-α-phenyl-cyclo-hexaneglycolate, and an inert pharmaceutical carrier.

11. A pharmaceutical composition containing per dosage unit about 10–30 mg. 4:7-phenanthroline-5:6-quinone about 100–300 mg. 5-chloro-7-iodo-8-hydroxy-quinoline and about 1–3 mg. diethyl-(2-hydroxyethyl)-methyl-ammonium-bromide α-phenyl-cyclohexaneglycolate, and an inert pharmaceutical carrier.

12. A pharmaceutical composition containing per dosage unit about 20 mg. 4:7-phenanthroline-5:6-quinone about 200 mg. 5-chloro-7-iodo-8-hydroxy-quinoline and about 2 mg. diethyl-(2-hydroxyethyl)-methyl-ammonium-bromide α-phenyl-cyclohexaneglycolate, together with an inert pharmaceutical carrier.

13. A process which comprises administering to a host subject to intestinal infection, an oral pharmaceutical composition as claimed in claim 1.

14. A process which comprises administering to a host subject to intestinal infection, an oral pharmaceutical composition as claimed in claim 7.

15. A process which comprises administering to a host suffering from obstipation an oral pharmaceutical composition as claimed in claim 1.

16. A process which comprises administering to a host suffering from meteorism an oral pharmaceutical composition as claimed in claim 1.

17. A process which comprises administering to a host suffering from flatulence an oral pharmaceutical composition as claimed in claim 1.

18. A process which comprises administering to a host suffering from diarrhoea an oral pharmaceutical composition as claimed in claim 7.

References Cited by the Examiner

"Mexaform," T. M. Reg. No. 666,783, Sept. 9, 1958.
Ally: Chem. Abst., vol. 51, 1957, page 15786 C.
Nils: Chem. Abst., vol. 51, 1957, page 18110A.
Kradolfer: Antibiotics and Chemotherapy, vol. 8, 1958, pages 297–301 and 307.
Jordan: Modern Drug Encyclopedia, 7th ed., 1958, pages 76–77.

LEWIS GOTTS, *Primary Examiner.*

FRANK CACCIAPAGLIA, JR., *Examiner.*